United States Patent [19]
Kamiya

[11] 3,813,718
[45] June 4, 1974

[54] METHOD OF MANUFACTURING ROLL THREADED SCREWS HAVING ELASTICITY

[76] Inventor: Minoru Kamiya, 2-46-3 Minami-Otsuka, Tokyo, Japan

[22] Filed: May 24, 1973

[21] Appl. No.: 363,597

[52] U.S. Cl............... 10/10 R, 72/88, 85/48, 151/22
[51] Int. Cl............... B21h 3/06, B23g 7/00
[58] Field of Search ........ 10/10 R, 86 A; 72/88, 89, 72/90, 469; 85/46, 48; 151/14 R, 22

[56] References Cited
UNITED STATES PATENTS

| | | | |
|---|---|---|---|
| 2,788,046 | 4/1957 | Rosan | 85/48 X |
| 3,323,402 | 6/1967 | Gowen et al | 85/46 X |
| 3,517,717 | 6/1970 | Orlomoski | 151/22 |
| 3,526,914 | 9/1970 | Breed | 10/10 R |
| 3,590,409 | 7/1971 | Bergere | 10/10 R |
| 3,693,389 | 9/1972 | Podell et al | 72/88 |

*Primary Examiner*—Charles W. Lanham
*Assistant Examiner*—E. M. Combs
*Attorney, Agent, or Firm*—James H. Littlepage

[57] ABSTRACT

A method of manufacturing roll threaded screws having elasticity by forming a helical groove in a screw workpiece in conformity to the pitch or lead of the screw to be produced, and then urging a thread rolling die against the workpiece on said helical groove or on the workpiece body other than said helical groove and moving the die relative to the workpiece, thereby forming a closed helical space in the top or root of the thread.

3 Claims, 10 Drawing Figures

FIG. 5a  FIG. 5b
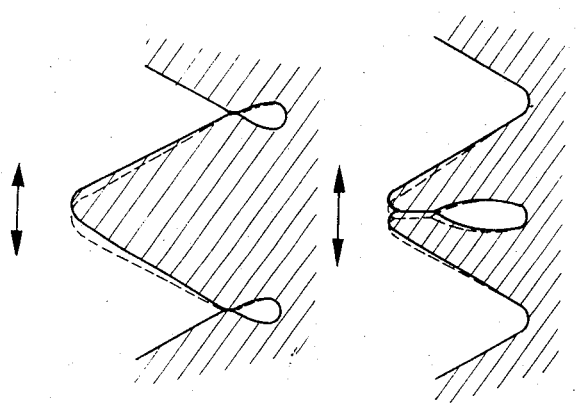
FIG. 6a  FIG. 6b
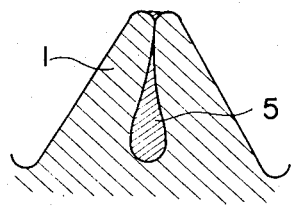 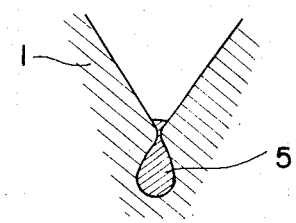

3,813,718

METHOD OF MANUFACTURING ROLL THREADED SCREWS HAVING ELASTICITY

BRIEF DESCRIPTION OF THE INVENTION

This invention relates to a method of manufacturing roll threaded screws having elasticity.

It is practically impossible, although theoretically possible, to have perfect mesh between bolt and nut having threads at perfectly the same pitch. Besides, under actual conditions in use strains are produced in various parts of the thread due to loads, so that the degree of local concentration of the stress is further increased. Therefore, it is a well-known fact that the ordinal safety value of the screw should be set very low. Mr. E. Jacguet has given the following experimental data obtained under simple assumptions in case of fitting a six-thread nut on a square thread with a root diameter of 16 mm and an outer diameter of 20 mm.

Of a total load of 1,000 kilograms, 500 kilograms is borne by the first thread, 250.5 kilograms by the second thread, 126.5 kilograms by the third thread, 64.4 kilograms by the fourth thread, 35.1 kilograms by the fifth thread, and 23.1 kilograms by the sixth thread (figures below the first place of the decimal being omitted).

These figures result in ideal cases where the bolt and nut perfectly mesh with each other. Actually, the load distribution is of course more complicated. At any rate, while the screw is very simple in structure, it presents in fact many problems to be solved.

One problem of primary importance is to uniformalize, that is to render uniform, the load on the thread in order to promote the strength and durability of the thread. To this end, it is most ideal to allow the thread to readily undergo elastic deformation instead of the rigid screw workpiece.

Prior-art measures for this include one using a female screw (nut) of a non-iron metal having a comparatively high modulus of elasticity and one where such means as a coil spring is inserted between the male and female threads. These measures, while intended to render uniform the stress distribution over the length of the thread, are expensive due to their strength or their complicated construction and consequently, are not practially employed.

The present invention is successful in manufacturing screws having elasticity and capable of precluding the drawbacks inherent in prior-art screws. The invention features a method of manufacturing roll threaded screws having elasticity by forming a helical groove in workpiece screw eorkpiece in conformity to the pitch or lead of the screw to be produced and then forcing a thread rolling die against the workpiece on the helical groove portion or a portion other than said helical groove and moving the die relative to the workpiece, thereby forming a closed helical space in the top or root of the thread.

BRIEF DESCRIPTION OF THE DRAWINGS

In order for the invention to be more fully understood, it will now be described in connection with the accompanying drawing, in which:

FIG. 5a is a view showing the elastic deformation of a thread formed in the root thereof with a closed helical space according to the invention;

FIG. 5b is a view showing the elastic deformation of a thread formed in the top thereof with a closed helical space according to the invention; and FIGS. 6a and 6b shows the threads formed with respective closed helical spaces, which are filled with an elastic plastic material.

DETAILED DESCRIPTION OF THE INVENTION

Figure 1A:
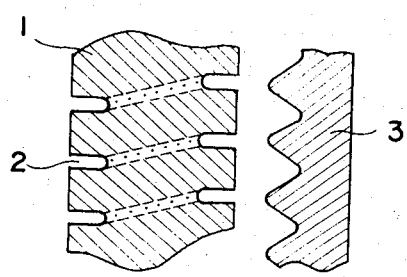
FIG. 1a is a fragmentary sectional view showing a screw workpiece formed with a helical groove in conformity to the pitch or lead of the screw to be produced and a thread rolling die.
Figure 1B:
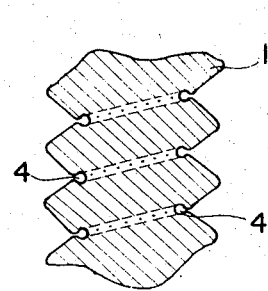
FIG. 1b is a fragmentary sectional view showing the produced screw.
Figure 2A:
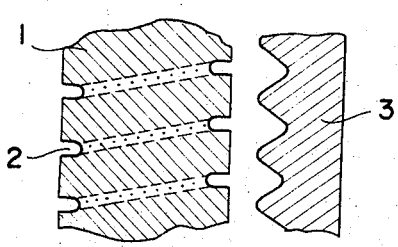
FIG. 2a is a view similar to FIG. 1a but showing a different example.
Figure 2B:
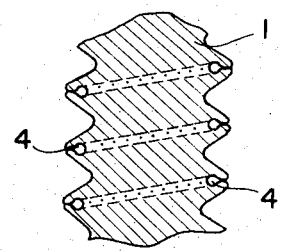
FIG. 2b is a view similar to FIG. 1b but showing a different screw produced.

Referring now to FIGS. 1a and 1b, in the method according to the invention a thin helical groove having the same pitch or lead as the screw to be produced is formed in the workpiece 1 by a suitable means such as rolling, grinding or cutting prior to forming the thread.

The standards of the helical groove formed prior to the formation of the thread vary with various ratings of the screws such as the shape thereof and the pitch thereof. However, it has been found from experiments that sufficient results could be obtained by setting the depth of the groove to about one half of the height of the thread when forming the groove in the top of the thread and to be in a range between the height of the thread and one half the thread height when forming the groove in the root of the thread.

Further, for determining the diameter of the screw workpiece the difference of the volume of the material before and after the formation of the groove must of course be incorporated into the general formulas from the condition that the volume of the workpiece is equal to the volume of by product provided the peeling and longitudinal elongation wellknown the material are not assumed to result.

In the case of forming the closed helical space in the root of the thread, the top of the thread of the thread rolling die 3 is aligned to the center line of the groove 2 as shown in FIG. 1a. Then, the die is rolled in forced contact with the workpiece similar to the usual thread rolling method, whereby the opening of the groove is closed due to the plastic deformation of the material between adjacent turns of the groove, so that a closed space is formed in the root of the thread as shown in FIG. 1b. In this case, it might be thought that the strength is greatly reduced since the effective root diameter is reduced due to the closed groove formed under the root of the thread. However, since the closed space 4 is eventually formed due to the plastic deformation by the rolling operation, it is possible to obtain very excellent stress distribution, so that the strength of the thread is hardly changed. In the case of forming the closed helical space in the top of the thread, the top of the thread of the thread rolling die 3 is aligned to a position midway between adjacent turns of the groove 2.

Then, by rolling the die in forced contact with the workpiece the material opposite the sides of the groove, is plastically deformed to cover the groove, so that a closed space is formed in the top of the thread.

It is to be noted that with the method according to the invention, since a thin helical groove is formed prior to the formation of the thread, the plastic deformation of the workpiece material is made easier. Thus, it is possible to reduce the rolling pressure. Also, it is possible to produce large diameter bolts in a cold process, which has heretofore been impossible.

Figure 3:
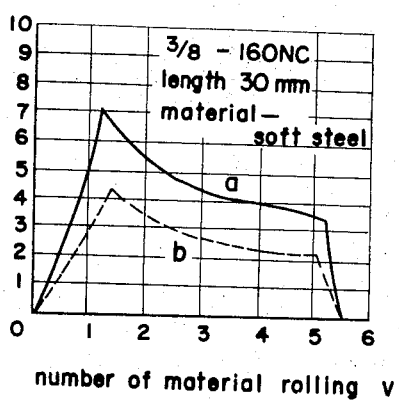
FIG. 3 is a graph showing a pressure curve according to the prior-art thread rolling method and a pressure curve obtained with the method according to the invention.

FIG. 3 shows emperical data, with which the reduction of the rolling pressure is proved. In the Figure, solid line (a) represents a pressure curve for rolling pressure required when forming the usual angle thread, and dashed line (b) represents a pressure curve for producing the thread provided with a closed space in the top of the thread according to the invention. A great difference between the rolling pressure in the prior art and that according to the invention is evident from this graph.

As has been mentioned earlier, in order to elevate the allowable upper limit of the load to be borne by the thread mechanism the distribution of the load on the individual turns of the thread should naturally be uniform. Among various measures for achieving this, the thread reinforcing method according to the invention is best suited to mass production and industrialization.

Figure 4:
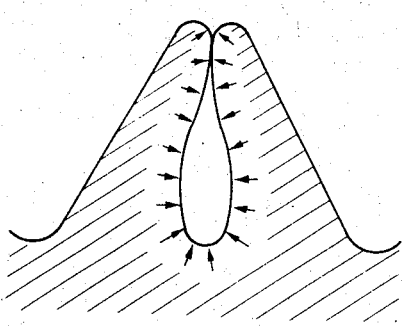
FIG. 4 shows, to an enlarged scale, the profile of a thread formed with a closed helical space in the top of the thread.

FIG. 4 shows an enlarged sectional view of a thread provided with a closed space in the top portion of the thread according to the invention. This space has a profile similar to that of a water droplet resulting from the sidewise plastic deformation of the initially formed groove at the time of formation of the thread. With this shape of the space the stress concentration surface is minimized, so that the strength of the thread itself is hardly changed.

Another important fact to be noted is that the thread according to the invention is very elastic compared to prior-art threads of the same type. In case where the closed space is formed in the root of the thread as shown in FIG. 5a, the thread has a nodal character, so that it can be readily displaced with respect to lateral pressure as indicated by a dashed line, which contributes to the uniformalization of the load distribution. In the case where the closed space is formed in the top of the thread as shown in FIG. 5b, the side walls on the opposite sides of the space can be individually displaced with respect to loads as shown by a dashed line, which again promotes the uniformalization of the load distribution.

As has been described in the foregoing, according to the invention it is possible to simply obtain a thread structure capable of uniformly distributing the load by forming the most versatile elastic thread without deteriorating the strength of the thread structure.

While the illustrated embodiments have been concerned with the manufacture of male threads, the method according to the invention may also be applied to the manufacture of female threads and also large diameter bolts and nuts. This is because the production of female threads (nuts) and large diameter bolts and nuts is facilitated by previously forming a helical groove. In this case, a closed space may be formed in the thread similar to the previous embodiments to obtain similar effects.

Also, it is preferable to fill the space formed in the above way with an elastic plastic material, as shown in FIGS. 6a and 6b, to the rust-proof end by suitable means such as blowing or otherwise applying plastics in liquid form.

What we claim is:

1. A method of manufacturing roll threaded screws having elasticity comprising the steps of forming a helical groove on a screw workpiece at a pitch consistent with that of the screw to be produced, and forcing a thread rolling die against the workpiece with a force sufficient to deform the workpiece material and form a closed helical space in the resultant thread.

2. Method according to claim 1, wherein the top of the thread of the thread rolling die is forced against the helical groove, thereby forming a closed helical space in the root portion of the resultant thread.

3. Method according to claim 1, wherein the top of the thread of the thread rolling die is forced against the material of the workpiece between adjacent turns of the helical groove, thereby forming a closed helical space in the top portion of the resultant thread.

* * * * *